March 19, 1929.  L. J. VAN DUZER  1,706,050
CARBON REMOVING TOOL
Filed Dec. 4, 1926
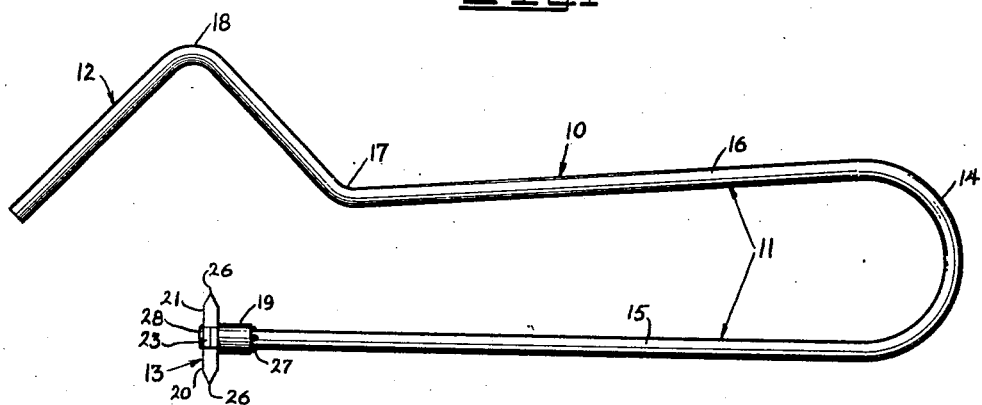
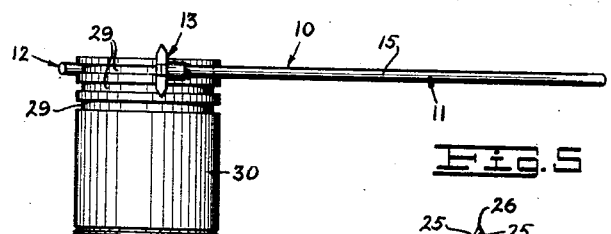
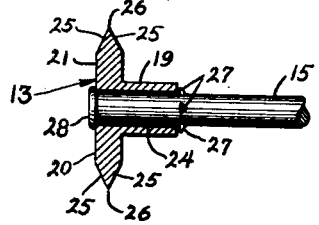
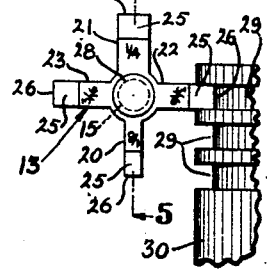
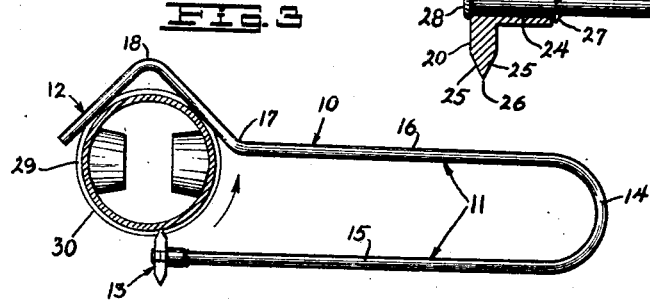
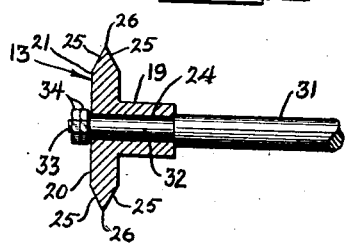
INVENTOR.
L. J. VAN DUZER
BY
ATTORNEY.

Patented Mar. 19, 1929.

1,706,050

UNITED STATES PATENT OFFICE.

LYLE J. VAN DUZER, OF LOS ANGELES, CALIFORNIA.

CARBON-REMOVING TOOL.

Application filed December 4, 1926. Serial No. 152,565.

This invention relates to cutting tools.

The general object of the invention is to provide a simple and efficient tool for cleaning ring grooves of a piston.

A specific object of the invention is to provide a piston ring groove scraper which is adapted to operate on various sizes of piston ring grooves.

A further object of the invention is to provide a scraping tool of the class described which is self aligning with the piston ring groove and which while it efficiently removes all foreign matter from said groove will not enlarge the width of the groove.

Other objects and advantages of this invention will be apparent from the following description taken in connection with the accompanying drawing wherein:

Fig. 1 is a top plan view of my improved cutting tool.

Fig. 2 is a side view of the scraper showing it in a working position on a piston.

Fig. 3 is a top plan view of the scraper in a piston ring groove showing the piston in section to more clearly illustrate the cutting operation.

Fig. 4 is an end view of the scraper showing the manner in which it fits a piston ring groove.

Fig. 5 is a section taken on line 5—5 of Fig. 4, and,

Fig. 6 is a view similar to Fig. 5 showing another method of attaching the scraping element to the handle.

This invention is particularly adapted for removing carbon from the piston ring grooves of internal combustion engine pistons, but it may be used for other purposes which will readily suggest themselves.

Referring to the drawing by reference characters I have indicated my invention generally at 10 as comprising a handle 11, a guide portion 12 and a scraping element 13. The handle 11 comprises a single length of material such as spring wire bent to form a loop 14 and two hand engaging members 15 and 16. The members 15 and 16 normally converge from the loop 14 inwardly toward their free ends.

The guide portion 12 is integral with the handle 11 and is formed by bending the member 16 outwardly as at 17 at approximately forty-five degrees and then again bending it as at 18, inwardly again at an angle of approximately ninety degrees to the first bend.

The scraping element 13 consists of (see Figs. 4 and 5) a body including a hub 19 and radially extending fingers 20, 21, 22, and 23. The body is provided with a bore 24.

The fingers 20, 21, 22, and 23 are preferably of different widths to fit piston ring grooves of different widths, and as shown in Fig. 4 they may be marked to designate their respective sizes. In Fig. 4 I have illustrated the finger 20 as being one-eighth (⅛) of an inch wide, the finger 21 as one-quarter (¼) inch wide, and the fingers 22 and 23 as each being three sixteenths (3/16) of an inch in width, as the three-sixteenths inch size is the most frequently used. Each of the fingers have their outer ends beveled as at 25 to form a scraping edge 26 thereon.

The scraping element 13 is mounted on the portion 15 of the handle 11 by inserting the same in the bore 24. The element is secured on the handle by providing upstruck bosses 27 on the member and by riveting over the end of the member 15 in the front of the fingers to form a head 28.

When the scraper 13 is assembled on the member 15 and the tool is arranged in a piston the scraping edge 26 will be positioned at one side of the diameter of the piston which passes through the bend 18. This places the scraping edge in front of the vertical center line of the piston when the handle 11 is being rotated in the direction of the arrow in Fig. 3. This gives the scraper a better shearing action.

The method of using the device for scraping the piston ring grooves is clearly illustrated in Figs. 2 and 3. In these views I have shown the device 10 in position for scraping one of the piston ring grooves 29 of a piston 30.

To place the device 10 in position for operating, it is necessary after selecting the desired width of scraper finger and turning it to proper position, to spread the members 15 and 16, place the guide 12 over the groove to be scraped and then insert the desired finger in the groove. The natural resiliency of the parts will cause the guide portion 12 to fit the groove and hold the cutter in the groove. It is then only necessary to tightly grip the handle portions 15 and 16 and rotate the device around the piston 30 in the direction of the arrow (see Fig. 3).

As the device is rotated around the piston the finger 22 as shown in Fig. 4 removes all foreign matter from the bottom and from the side walls of the piston ring groove 29.

The resiliency of the handle 11 allows any desired pressure to be applied to the finger 22, as the tighter the handle portions 15 and 16 are gripped the more pressure will be applied.

In Fig. 6 I have illustrated another manner of securing the scraping element 13 to a rod 31 similar to the portion 15 of the previously mentioned form. The rod 31 has a reduced end portion 32 on which the scraper 13 is mounted and the portion 32 has a reduced threaded end 33. In this form the scraper 13 is retained in position by the shoulder formed at the juncture of the rod 31 and the reduced portion 32, and by nuts 34 on the threaded end portion 33.

With this form of retaining means it is very easy to replace the scraper 13 if this should be desirable for any reason.

From the foregoing description it will be apparent that I have provided a tool for scraping piston ring grooves which can be economically manufactured, is highly efficient in use, simple in construction and can be easily operated.

What I claim is:

A tool of the class described comprising a handle formed of a looped wire having a guide member on one end, said member being V-shaped to engage a piston groove at spaced points on one side of the piston, the other end of said wire having a cylindrical portion thereon, a scraper having an elongated hub on said cylindrical portion, said scraper being adapted to engage said groove at the opposite side of the piston.

In testimony whereof, I hereunto affix my signature.

LYLE J. VAN DUZER.